United States Patent [19]

Massie

[11] 3,880,938
[45] Apr. 29, 1975

[54] HYDROFORMYLATION USING AGED ZEOLITE-ALUMINA HYDROSOL DISPERSION

[75] Inventor: Stephen N. Massie, Palatine, Ill.

[73] Assignee: Universal Oil Products Company, Des Plaines, Ill.

[22] Filed: Sept. 10, 1973

[21] Appl. No.: 396,289

[52] U.S. Cl......... 260/632 HF; 252/455 Z; 260/602; 260/604 HF; 260/615 R; 260/633; 260/643 G
[51] Int. Cl.............................................. C07c 29/00
[58] Field of Search............ 260/632 HF; 252/455 Z

[56] References Cited
UNITED STATES PATENTS
2,683,177  7/1954  Field........................... 260/632 HF
3,677,973  7/1972  Mitsche et al................... 252/455 Z
3,798,177  3/1974  Reed et al....................... 252/455 Z Primary Examiner—Joseph E. Evans
Attorney, Agent, or Firm—James R. Hoatson, Jr.; Raymond H. Nelson; William H. Page, II

[57]  ABSTRACT

A hydroformylation process comprising the treatment of an unsaturated compound with carbon monoxide and hydrogen in the presence of a catalyst comprising a cobalt-containing compound is improved by the presence of a zeolite which has been dispersed in an alumina hydrosol prior to aging at elevated temperatures.

11 Claims, No Drawings

HYDROFORMYLATION USING AGED ZEOLITE-ALUMINA HYDROSOL DISPERSION

This invention relates to a process for hydroformylating an unsaturated compound in the presence of a catalyst comprising a cobalt-containing compound. More specifically, this invention relates to a process for hydroformylating an unsaturated compound which comprises reacting said compound with carbon monoxide and hydrogen in the presence of a catalyst comprising a cobalt-containing compound, the improvement which consists in adding the elements of carbon monoxide and hydrogen at the original position of the unsaturated bond with a minimum amount of isomerization prior to the hydroformylation by effecting said hydroformylation in the presence of a zeolite which has been dispersed in an alumina hydrosol prior to aging at elevated temperatures.

Processes directed to the production of reaction mixtures comprising substantial amounts of aldehydes and alcohols by the hydroformylation of unsaturated compounds with carbon monoxide and the hydrogen in the presence of certain catalysts are well-known in the art. The aldehydes and alcohols produced generally correspond to the compounds obtained by the addition of a carbonyl or carbinol group to an olefinically unsaturated carbon atom in the starting material with simultaneous saturation of the olefin bond. The process is known as hydroformylation and it involves a reaction wihch may be shown by the general generic formula:

(I) 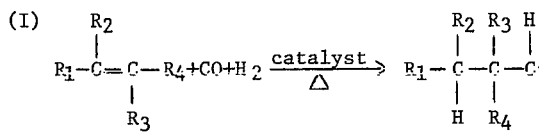 and/or 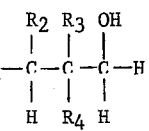

where $R_1$, $R_2$, $R_3$, $R_4$ may be chosen from a group comprising an organic, halide or hydrogen radical.

It has been shown in the prior art that dicobalt octacarbonyl has generally been used as the catalyst for the hydroformylation of the unsaturated compounds. This catalyst, which can be prepared from many forms of cobalt, usually decomposes rapidly unless high pressures of about 200–4,500 lbs. per sq. inch gauge of carbon monoxide are maintained. Correspondingly high pressures of hydrogen are also necessary. Another disadvantage inherent in the hydroformylation is a relative inability to direct the reactions involved to the production of products arising from the hydroformylation at the original position of the unsaturated compounds when predominantly terminal unsaturated compounds are utilized.

In contradistinction to the prior art, it has now been shown that the presence of a zeolite which has been dispersed in an alumina hydrosol prior to aging at an elevated temperature will effect the hydroformylation to occur at the original site of the olefinic bond. The utilization of the present invention will enable the manufacturer to more accurately determine the resultant position of the alcoholic or aldehydic moiety, as the olefinic bond has less tendency to isomerize during hydroformylation. The manufacturer will also be allowed to produce branched chain alcohols and aldehydes which can be used as intermediates in the preparation of detergents and wetting agents, said compounds possessing excellent wetting ability and foam stability, but lower fish toxicity as a result of the utilization of the present invention. Yet another advantage which occurs as a result of the utilization of the set forth invention is that the presence of the treated zeolite does not create an increase in an undesirable products such as alkanes.

The desired products of the process of this invention, namely alcohols and aldehydes, are utilized in the chemical industry in many ways. For example, alcohols are utilized in the synthesizing of other organic derivatives, as solvents, as an extraction medium, in dyes, synthetic drugs, synthetic rubbers, detergents, cleaning solutions, surface coatings, cosmetics, pharmaceuticals, in the preparation of esters, as a solvent for resin in coatings, in plasticizers, dyeing assistants, hydraulic fluids, detergent formulations and dehydrating agents. Aldehydes are utilized as perfumeries or precursors to perfumeries, or in the synthesis of primary alcohols. The non-linear alcohols and aldehydes are also utilized in the chemical industry in many other ways; for example, 2-methyl-1-butanol is utilized as a solvent in varnishes, lacquers and paint removers. Likewise, a general use of the non-linear alcohols and aldehydes is in detergent formulations as exemplified by 2-hexyl-1-heptanol.

It is therefore an object of this invention to provide a process for the preparation of alcohols and aldehydes.

A further object of this invention is to provide an improvement in a process for the preparation of alcohols and aldehydes utilizing a zeolite in order to produce a greater percent of alcohols and aldehydes in a more expedient manner, said zeolite having been dispersed in an alumina hydrosol prior to aging at elevated temperatures.

In one aspect an embodiment of this invention resides in a process for the preparation of an alcohol or an aldehyde which comprises hydroformylating an unsaturated compound possessing four or more carbon atoms by treatment with hydrogen and carbon monoxide at reaction conditions in the presence of a catalyst comprising a cobalt-containing compound and recovering the resultant alcohol or aldehyde compound, the improvement which consists in reducing the amount of isomerization prior to hydroformylation by effecting said hydroformylation in the presence of a zeolite which has been dispersed in an alumina hydrosol prior to aging at elevated temperatures in the range of about 30°C to about 500°C.

A specific embodiment of this invention resides in a process for the hydroformylation of decene-5 which comprises the treatment of decene-5 with carbon monoxide and hydrogen in the presence of a catalyst comprising dicobalt octacarbonyl at a temperature in the range of from about 100°C to about 200°C and a pressure of 120 atmospheres of hydrogen and 120 atmospheres of carbon monoxide, said hydroformylation also being effected in the presence of a zeolite comprising 15% mordenite which has been dispersed in a 67% aluminum chloride-33% aluminum sulfate sol prior to aging at a temperature in the range of from about 100°C to about 150°C and a pressure in the range of from about 1 atmosphere to about 100 atmospheres for a period of time comprising five hours, thereby producing 2-pentyl-1-hexanol.

Another specific embodiment of this invention resides in a process for the hydroformylation of tetradecene-7 which comprises the treatment of the tetradecene-7 with carbon monoxide and hydrogen in the presence of a catalyst comprising dicobalt octacarbonyl at a temperature at 110°C and a pressure of 120 atmospheres of hydrogen and 120 atmospheres of carbon monoxide, said hydroformylation also being effected in the presence of a zeolite comprising 10% mordenite dispersed in an aluminum chloride hydrosol prior to aging at a temperature of 400°C and a pressure of 1 atmosphere for a period of time comprising ten hours, thereby producing 2-heptyl-1-octanol.

Another specific embodiment of this invention resides in a process for the hydroformylation of hexadecene-1 which comprises the treatment of hexadecene-1 with carbon monoxide and hydrogen in the presence of a catalyst comprising dicobalt octacarbonyl at a temperature of 110°C and a pressure of 120 atmospheres of carbon monoxide and 120 atmospheres of hydrogen, said hydroformylation also being effected in the presence of a zeolite comprising 15% mordenite which has been dispersed in a 67% aluminum chloride-33% aluminum sulfate sol prior to aging at a temperature in the range of 100°C to about 150°C and a pressure in the range of about 1 atmosphere to about 100 atmospheres for a period of time comprising 5 hours, thereby producing heptadecanol-1.

Other objects and embodiments will be found in the following further detailed description of the present invention.

As hereinbefore set forth the present invention is concerned with a process for preparing alcohols and aldehydes, said process being effected by the hydroformylation of an unsaturated compound with carbon monoxide and hydrogen in the presence of a catalyst comprising a cobalt-containing compound. The hydroformylation is effected under conditions which include a temperature of from about 75°C to about 300°C and preferably in a range of about 100°C to about 200°C. In addition, another reaction condition involves pressure, said pressure ranging from atmospheric up to 500 atmospheres or more. When superatmospheric pressure is employed, said pressure is afforded by the introduction of gaseous carbon monoxide or hydrogen to the reaction zone or, if so desired, the pressure may be partially afforded by the carbon monoxide or hydrogen while the remaining pressure is afforded by a substantially inert gas such as nitrogen, helium or carbon dioxide, although not necessarily with equivalent results.

Examples of suitable unsaturated compounds which are utilized as a starting material in the hydroformylation process of this invention include, in particular, butene-1, butene-2, isobutene, pentene-1, pentene-2, 2-methylbutene-1, 2-methylbutene-2, hexene-1, 3-methylpentene-1, 2-methylpentene-2, heptene-2, 2-methylhexene-2, 3-methylhexene-2, octene-1, octene-2, heptene-1 nonene-1, decene-1, 3-methylheptene-1, 2-methylheptene-2, nonene3, 3-methyloctene-2, decene-2, decene-5, decene-4, decene-3, 3,4-dimethyloctene-2, 4-ethyloctene-2, undecene-3, undecene-4 undecene-2, undecene-1, undecene-5, 4-methyldecene-2, 4,5-dimethylnonene-2, dodecene-1, dodecene-2, dodecene-3, dodecene-4, dodecene-5, tridecene-1, tridecene-2, tridecene-3, tetradecene-2, tetradecene-3, tetradecene-4, tetradecene-5, tetradecene-6, tetradecene-7, pentadecene-4, pentadecene-5, pentadecene-6, pentadecene-1, hexadecene-1, heptadecene-2, heptadecene-1, hexadecene-3, 2-methoxybutene-2, 2-methoxypentene-1, 2-methoxyhexene-1, 1-propoxyheptene-1, 2-ethoxyoctene-1, 2,3-diethoxyundecene-3, 1-chlorobutene-2, 2-chloropentene-1, 2-bromohexene-2, 2,3-dichlorooctene-1, 3-idooctene-2, 2-methoxy-3-chlorodecene-2, 3,4-dimethyl-2-chlorooctene-2, or mixtures of linear internal and terminal olefins such as internal olefins possessing carbon numbers between 11 and 14 or 15 and 18, etc. It is understood that the aforementioned unsaturated compounds are only representative of the class of compounds which may be employed and that the present invention is not necessarily limited thereto.

The catalytic compositions of matter which are used in the process of this invention comprise compounds containing cobalt such as dicobalt octacarbonyl.

It is also contemplated within the scope of the process of the present invention that the hydroformylation may be effected in an inert organic media as exemplified by n-pentane, n-hexane, n-heptane, n-octane, n-nonane, isooctane (2,2,4-trimethylpentane), cyclohexane, methylcyclohexane, benzene, toluene, m-xylene, mesitylene, etc. It is understood that the aforementioned inert organic media are only representative of the class of compounds which may be employed, and that the present invention is not necessarily limited thereto.

The process of the present invention, as hereinafter set forth in greater detail, demonstrates that the presence of a zeolite will reduce the isomerization of the olefin which occurs prior to hydroformylation, said zeolite having been dispersed in an alumina hydrosol prior to aging at elevated temperatures. Zeolites as hereinbefore set forth are contemplated to include all aluminosilicates, both natural and synthetic, including mordenite and faujasite.

Zeolites are crystalline aluminosilicates comprising cages or cavities interconnected by smaller pores or channels of definite size range characteristic of each zeolitic variety. Since the dimensions of the pores and channels are such as to accept molecules of certain dimension while rejecting those of larger dimensions the materials have come to be known as molecular sieves and are utilized in many ways taking advantage of these properties.

The zeolites are generally described as a three-dimensional network of fundamental structural units consisting of silicon-centered $SiO_4$ and aluminum-centered $AlO_4$ tetrahedra interconnected by a mutual sharing of apical oxygen atoms to effect a chemical balance, each $AlO_4$ tetrahedra has a cation associated therewith, typically sodium. The $SiO_4$ and $AlO_4$ tetrahedra are arranged in a definite geometric pattern often visualized either in terms of chains, layers or polyhedra. The zeolites comprise well-defined intra-crystalline dimensions including intra-crystalline channels and pores whose narrowest cross-section has essentially a uniform diameter. The various zeolites may be classified according to the geometric pattern of their framework with its attendant pore size, and by the $SiO_2$:$Al_2O_3$ mole ratio of their compositions.

One type of zeolitic catalyst contemplated within the scope of this invention is mordenite. Mordenite is highly siliceous in nature and characterized by a $SiO_2$:$Al_2O_3$ mole ratio of from about 6 to about 12 as manufactured or found in its natural state. The mordenite crystal structure comprises four and five membered rings of $SiO_2$ and $AlO_4$ tetrahedra so arranged that the resulting crystal lattice comprises pores and channels running parallel along the crystal axis to give a tubular configuration. Mordenite is unique among zeolites since the channels or tubes do not intersect and access to the cages or cavities is in only one direction, thereby giving the zeolitic structure its two-dimension configuration.

Another type of zeolitic catalyst contemplated within the scope of this invention is faujasite. Faujasite is characterized by a $SiO_2:Al_2O_3$ ratio of about 2 to about 6 and by pore openings in the range of from about 6 to about 15 Angstroms. The fundamental structural units, $SiO_4$ and $AlO_4$ tetrahedra, are joined to form four-membered and six-membered rings and the rings are so arranged that the resulting structure resembles a truncated octahedron with the four-membered ring forming six sides or faces thereof and the six-membered ring forming the remaining eight sides or faces. The resulting truncated octahedra are interconnected at the hexagonal faces through a hexagonal prism formed by two of the six-membered rings of tetrahedra to form a crystal lattice comprising cavities or cages in open communication through channels, thereby giving the zeolitic structure is three-dimensional configuration. Other natural zeolites which may be utilized include analcite, chabazite, heulandite, natrolite, stilbite and thomsonite. It is also contemplated within the scope of the process of this invention that synthetic zeolitic catalyst may also be utilized. The synthetic zeolites would include all those varities ranging from gelatinous to porous or sandlike.

The above mentioned zeolite is treated by a dispersion in an alumina hydrosol prior to aging at elevated temperatures. The treatment is a two-step process: first where the zeolite is dispersed within an alumina hydrosol, and second when it is aged at elevated temperature in the range of about 45°C to about 200°C and preferably in the range of about 90°C to about 160°C for a period of time from 1 to 20 hours or more. An alumina hydrosol may be prepared from compounds such as aluminum chloride, aluminum bromide, aluminum sulfate, aluminum alcoholate, etc., the aluminum chloride being the most generally employed. Suitable examples of alumina hydrosols would include aluminum halide hydrosols, such as aluminum chloride sols, aluminum bromide sols, aluminum-chlorosulfate hydrosol and aluminum acetate hydrosol.

The process of this invention may be effected in any suitable manner and may comprise either a batch or continuous type operation. For example, when a batch type operation is employed, the reactant comprising the unsaturated compound, is placed in an appropriate apparatus along with a catalyst comprising a cobalt-containing compound plus the presence of a mordenite-alumina or faujasite-alumina (which had previously been heated to an elevated temperature for a predetermined increment of time to effect aging). The autoclave is sealed, carbon monoxide and hydrogen are pressed in until the desired operating pressure is reached, heated to a desired operating temperature and maintained thereat for a predetermined period of time. At the end of this time, which may comprise from about 0.5 to about 20 hours or more in duration, the heating is terminated and the autoclave vented, thereby allowing the autoclave to return to room temperature and ambient pressure. The reaction mixture is then recovered, separated from the catalyst and the mordenite-alumina or faujasite-alumina, and subjected to conventional means of purification and separation, said means including washing, drying, extraction, evaporation, fractional distillation, etc., whereby the desired alcohol or aldehyde is recovered.

It is also contemplated within the scope of this invention that the reaction process for obtaining the desired alcohols and aldehydes may be effected in a continuous manner of operation. When such a type of operation is employed, the catalyst and the reactants, namely a cobalt-containing compound dissolved in an unsaturated compound, the carbon monoxide and the hydrogen, are continuously charged to the reaction vessel containing a mordenite-alumina or faujasite-alumina (which had previously been heated to an elevated temperature for a predetermined increment of time to effect aging). The hydroformylation vessel is maintained at predetermined operating conditions of both temperature and pressure effected by the ingress of additional carbon monoxide and hydrogen. After completion of the desired residence time, the reactor effluent is continuously withdrawn and subjected to conventional means of separation whereby the desired alcohols and aldehydes are separated from the cobalt and recovered, while any unreacted starting materials comprising the unsaturated compound, carbon monoxide, or hydrogen are recycled to the reaction zone to form a portion of the feedstock. Inasmuch as the zeolite is solid in nature, various types of continuous operation may be used. One such type of operation comprises the fixed bed method in which the zeolite is disposed as a fixed bed in the reaction zone and the reactants and catalyst comprising the unsaturated compound, carbon monoxide, hydrogen and the cobalt catalyst are passed over the said fixed bed in either an upward or downward flow. Another type of operation which may be employed comprises the moving bed type operation in which the zeolite and the reactants plus catalyst are passed concurrently or countercurrently to each other, or the slurry type operation in which the zeolite is carried into the reaction zone as a slurry in the unsaturated compound. The cobalt values may be recovered from the reaction mixture by various methods known to the art and regenerated to form fresh catalyst.

Examples of alcohols and aldehydes which may be prepared according to the process of this invention would include the terminal alcohols and aldehydes when an alpha olefin or an alpha unsaturated compound is utilized as the starting material plus hydroformylation products which are non-linear in structure. Suitable examples of terminal alcohols and aldehydes would include 2-methyl-1-pentanol, 3-ethyl-1-hexanol, 2-propyl-1-heptanol, 3-ethyl-1-octanol, 2-ethyl-1-nonanol, 3-amyl-1-nonanol, 4-amyl-1-decanol, 3-hexyl-1-decanol, 3-heptyl-1-decanol, 4-propyl-1-undecanol, 3-amyl-1undecanol, 5-heptyl-1-dodecanol, 3-propyl-1-undecanol, 6-heptyl-1-tridecanol, 3-propyl-1-tetradecanol, 5-octyl-1-pentadecanol, 5-nonyl-1-heptadecanol, 2-pentyl-1-hexanol, 2-heptyl-1-octanol, 2-hexyl-1-heptanol, 2-hexyl-1-octanol, 2-heptyl-1-octanal, 2-hexyl-1-heptanal, 2-hexyl-1-octanal, 2-heptyl-1-octanal, 5-heptyl-1-tetradecanal, 3-propyl-1-heptadecanal, 1-pentanol, 1-hexanol, 1 -heptanol, 1-octanol, 1-nonanol, 1-decanol, 1-undecanol, 1-dodecanol, 1-tridecanol, 1-pentadecanol, 1-heptadecanol, etc.

The following examples are given to illustrate the process of the present invention which, however, are not intended to limit the generally broad scope of the present invention in strict accordance therewith.

EXAMPLE I

In this example, 145.0 millimoles of decene-5 were added to an 850 milliliter glass-lined rotating autoclave containing 1.0 millimoles of dicobalt octacarbonyl, dissolved in 5 milliliters of n-pentane, said autoclave being equipped with heating and pressure attainment devices. The rotating autoclave was sealed, pressurized by the entry of 120 atmospheres of carbon monoxide and 120 atmospheres of hydrogen, heated to a temperature of 110°C and maintained thereat for a period of time comprising one hour. At the end of the one hour period of time, the heating was terminated thereby allowing the rotating autoclave to return to room temperature and the carbon monoxide and hydrogen were carefully vented thereby allowing said autoclave to return to ambient pressure. At this point, the product was removed from the glass-lined rotating autoclave and analyzed by means of gas-liquid chromatography instrumentation, said analysis disclosed an 85 percent conversion of the decene-5 and a 33 percent linear selectivity as defined by the linear products divided by the total products expressed as a percentage, the non-linear products comprising mostly 2-pentyl-1-hexanol. It should also be noted that the analysis disclosed a zero percentage of decane formation.

EXAMPLE II

In this example the experiment of Example I was reproduced, maintaining the same physical constants. The gas chromatography analysis of Example II product mixture disclosed a 90 percent conversion of decene-5, a 31 percent linear selectivity and a zero percentage of decane formation.

EXAMPLE III

In this example the zeolite-dropping sol blend was prepared by digesting 726 grams of a basic aluminum sulfate slurry (6.89 percent alumina) with 769 grams of an aluminum chloride hydrosol (13.0 percent aluminum; 1.24 aluminum to chlorine ratio) in the presence of 60 grams of mordenite for about 4–5 hours at a temperature of 100°C to 105°C. This resulted in 900 cc of an aluminum-chloro-sulfate hydrosol plus mordenite. The sol was cooled and blended with 450 cc of 28 percent HMT (hexamethylene tetramine) and 50 grams of urea in an aqueous solution amounting to a total of 100 cc, and formed into 1/16 inch spheroidal hydrogel spheres which were then transferred to a pressure aging vessel and aged 1.5 hours at 150°C. The aged spheres were transferred to a wash tower and washed for 3 hours at a temperature of 95°C with 5 gallons of water containing 20 grams of ammonium nitrate and 20 cc of aqueous ammonia (28 percent). The washed spheres were removed from said wash tower and dried at 149°C after which they were calcined for 2 hours at 649°C, the finished catalyst being 15 percent by weight mordenite.

Five (5.0) grams of the above prepared treated mordenite catalyst were added to a rotating autoclave to which are subsequently added 145.0 millimoles of decene-5 and 1.0 millimole of dicobalt octacarbonyl, said autoclave being equipped with heating and pressure attainment devices. The rotating autoclave was sealed, pressurized by the entry of 120 atmospheres of carbon monoxide and 120 atmospheres of hydrogen, heated to a temperature of 110°C and maintained thereat for a period of time comprising 1 hour. At the end of the 1 hour period of time, the heating was terminated thereby allowing the rotating autoclave to return to room temperature and the carbon monoxide and hydrogen were carefully vented thereby allowing said autoclave to return to ambient pressure. At this point, the product was removed from the glass-lined rotating autoclave and analyzed by means of gas-liquid chromatography instrumentation, said analysis disclosed an 85 percent decene-5 conversion and a 16 percent linear selectivity, the increase in the non-linear compounds stemming from the increased presence of 2-pentyl-1-hexanol. It should also be noted that the analysis disclosed a zero percentage of decane formation.

It can be seen by a comparison of Examples I and II with Example III that the presence of the treated mordenite-alumina produced an increase in the percentage of non-linear compounds by an average of 16% (a 50 percent increase), indicating less isomerization of the olefin prior to hydroformylation.

EXAMPLE IV

In this example the zeolite-dropping sol blend comprises 800 grams of aluminum-chloride hydrosol; 75 grams of mordenite were disposed in the aluminum-chloride hydrosol for about 5 to 6 hours at a temperature of 105°C. This resulted in 950 cc of an aluminum-chloride hydrosol plus mordenite. The sol was cooled and blended with 450 cc of 28 percent HMT (hexamethylene tetramine) and 50 grams of urea in an aqueous solution amounting to a total of 100 cc, and formed into 1/16 inch spheroidal hydrogel spheres which were transferred to a pressure aging vessel and aged 1.5 hours at 150°C. The aged spheres were transferred to a wash tower and washed for 4 hours at a temperature of 100°C with 5 gallons of water containing 20 grams of ammonium nitrate and 20 cc of aqueous ammonia (28 percent). The washed spheres were removed from said wash tower and dried at 177°C after which they were calcined for 2 hours at 649°C, the finished catalyst comprising 10 percent by weight mordenite.

Five (5.0) grams of the above prepared treated mordenite catalyst were added to a rotating autoclave to which was subsequently added 500 millimoles of hexadecene-1 and 1 millimole of dicobalt octacarbonyl, said autoclave being equipped with heat and pressure attainment devices. The rotating autoclave was sealed, pressurized by the entry of 120 atmospheres of carbon monoxide and 120 atmospheres of hydrogen, heated to a temperature of 110°C, and maintained thereat for a period of time comprising 8 hours. At the end of the 8 hour period of time, the heating was terminated thereby allowing the rotating autoclave to return to room temperature, and the carbon monoxide and hydrogen were carefully vented thereby allowing said autoclave to return to ambient pressure. At this point, the product was removed from the glass-lined rotating autoclave and analyzed by means of gas-liquid chromatography instrumentation, said analysis disclosed a 75 percent hexadecene-1 conversion, and a 70% linear selectivity, the linear selectivity stemming from the increased hydroformylation of the olefin at its original position, namely 1-heptadecanol. The experiment was repeated under the same physical conditions with the exception that the treated zeolite was omitted. The gas-liquid chromatographic analysis of this reaction disclosed that the products possessed only a 43% linear selectivity.

It can be seen by comparison of these two reaction products that the presence of the treated mordenite-alumina created an increase in the percentage of compounds arising from the hydroformylation at the original position of the unsaturated bond. The starting olefin was an alpha olefin, which was reflected in a higher linear selectivity product utilizing the treated mordenite-alumina zeolite.

EXAMPLE V

In this example, the zeolite-dropping sol blend is prepared by digesting 1710 grams of basic aluminum sulfate slurry with 660 grams of aluminum-chloride hydrosol in the presence of 60 grams of mordenite for about 4 to 5 hours at a temperature of 105°C. This results in 950 cc of an aluminum chloro-sulfate hydrosol plus mordenite. The sol is cooled and blended with 450 cc of 28 percent HMT (hexylmethylene tetramine) and 50 grams of urea in an aqueous solution amounting to a total of 100 cc, and formed into 1/16 inch spheroidal hydrogel spheres which are then transferred to a pressure aging vessel and aged 1.5 hours at 150°C. The aged spheres are transferred to a wash tower and washed for 3 hours at a temperature of 95°C with 5 gallons of water containing 20 grams of ammonium nitrate and 20 cc of aqueous ammonia (28 percent). The washed spheres are removed from said water tower and dried at 149°C after which they are calcined for 2 hours at 649°C, the finished catalyst comprising 15 percent by weight mordenite.

Five (5.0) grams of the above prepared treated mordenite catalyst are added to a rotating autoclave to which is subsequently added 145.0 millimoles of decene-5 and 1 millimole of dicobalt octacarbonyl, said autoclave being equipped with heating and pressure attainment devices. The rotating autoclave was sealed, pressurized by the entry of 120 atmospheres of carbon monoxide and 120 atmospheres of hydrogen, heated to a temperature of 110°C and maintained thereat for a period of time comprising 1 hour. At the end of the 1 hour period of time, the heating is terminated thereby allowing the rotating autoclave to return to room temperature and the carbon monoxide and hydrogen are carefully vented thereby allowing said autoclave to return to ambient pressure. At this point, the product is removed from the glass-lined rotating autoclave and analyzed by means of gas-liquid chromatography instrumentation, said analysis disclosing a high percent decene-5 conversion and a low percent linear selectivity, the increase in the non-linear compounds stemming from the increased presence of 2-pentyl-1-hexanol.

It can be seen by a comparison of Examples I and II with Example V that the presence of the treated mordenite-alumina created an increase in the percentage of compounds arising from the hydroformylation of the unsaturated bond at its original position.

EXAMPLE VI

In this example the zeolite utilized is the same as that prepared in Example V shown. The reaction conditions are maintained at the same level with the exception of a temperature increase in the hydroformylation reaction of from 110°C to 150°C. The product is again analyzed by gas-liquid chromatography instrumentation, said analysis disclosing a 100 percent decene-5 conversion and an 11 percent linear selectivity, the increase in the non-linear compound stemming from the increased presence of 2-pentyl-1-hexanol. The analysis also discloses a 1 percent yield of decane.

It can be seen by comparison of Examples I and II with Example VI that the presence of the treated mordenite-alumina creates an increase in the percentage of non-linear compounds by an average of 21 percent (a greater than 50 percent increase).

EXAMPLE VII

In this example the zeolite utilized is that as prepared in Example V above. The reaction conditions are maintained constant as in Example V above with the exception that the temperature of hydroformylation is raised to 195°C. The product is again analyzed by gas-liquid chromatography instrumentation, said analysis disclosing a high percent conversion of decene-5, and a low percent linear selectivity, the increase in the non-linear compounds stemming from the increased presence of 2-pentyl-1-hexanol. The analysis also disclosed a low percentage of decane present.

It can be seen by a comparison of Examples I and II with Example VII that the presence of the treated mordenite-alumina created an increase in the percentage of compounds arising from the hydroformylation of the olefinic bond at its original position.

EXAMPLE VIII

In this example the zeolite is treated as set forth in Example III with the exception that faujasite is substituted in place of the mordenite.

Nine (9.0) grams of the above mentioned treated faujasite is added to an 850 milliliter glass-lined autoclave to which is subsequently added 145.0 millimoles of a mixture of dodecene-5, tridecene-6 and tetradecene-7 plus 1.0 millimole of dicobalt octacarbonyl, said autoclave being equipped with heating and pressure attainment devices. The rotating autoclave is sealed, pressurized by the entry of 120 atmospheres of carbon monoxide and 120 atmospheres of hydrogen, heated to a temperature of 110°C and maintained thereat for a period of time comprising 8 hours. At the end of the 8 hour period of time, the heating is terminated thereby allowing the rotating autoclave to return to room temperature and the carbon monoxide and hydrogen are carefully vented, thereby allowing said autoclave to return to ambient pressure. At this point the product is removed from the glass-lined rotating autoclave and analyzed by means of gas-liquid chromatography instrumentation, said analysis discloses a higher percentage of non-linear products than would have been expected from a hydroformylation if the treated faujasite-alumina had been excluded, namely due to the increase in the percentage of 2-hexyl-1-heptanol, 2-hexyl-1-octanol and 2-heptyl-1-octanol.

EXAMPLE IX

In this example the zeolite which is utilized was that as prepared in the set forth procedure of Example III.

Five (5.0) grams of the above mentioned treated mordenite-alumina is added to an 850 milliliter glass-lined rotating autoclave to which is subsequently added 145.0 millimoles of tetradecene-7 and 1 millimole of dicobalt octacarbonyl, said autoclave being equipped with heating and pressure attainment devices. The rotating autoclave is sealed, pressurized by the entry of 80 atmospheres of carbon monoxide and 40 atmospheres of hydrogen, heated to a temperature of 100°C and maintained thereat for a period of time comprising 1 hour. At the end of the 1 hour period of time, the heating is terminated thereby allowing the rotating autoclave to return to room temperature and the carbon monoxide and hydrogen are carefully vented, thereby allowing said autoclave to return to ambient pressure. At this point, the product is removed from the glass-lined rotating autoclave and analyzed by means of gas-lined chromatography instrumentation, said analysis disclosing a higher percentage of non-linear products than would have been expected from a hydroformylation if the treated mordenite-alumina had been excluded, namely due to the increase in the percentage of 2-heptyl-1-octanol.

EXAMPLE X

In this example the zeolite which is utilized was that as prepared in the setforth procedure of Example III.

Six (6.0) grams of the above mentioned treated mordenite-alumina is added to an 850 milliliter glass-lined rotating autoclave to which is subsequently added 150.0 milliliters of butene-2 and .9 millimoles of dicobalt octacarbonyl, said autoclave being equipped with heating and pressure attainment devices. The rotating autoclave is sealed, pressurized by the entry of 80 atmospheres of carbon monoxide and 50 atmospheres of hydrogen, heated to a temperature of 150°C and maintained thereat for a period of time comprising 90 minutes. At the end of the 90 minute period of time, the heating is terminated thereby allowing the rotating autoclave to return to room temperature and the carbon monoxide and hydrogen are carefully vented, thereby allowing said autoclave to return to ambient pressure. At this point, the product is removed from the glass-lined rotating autoclave and analyzed by means of gas-liquid chromatography instrumentation, said analysis disclosing a higher percentage of non-linear products than would have been expected from a hydroformylation if the treated mordenite-alumina had been excluded, namely due to the increase in the percentage of 2-ethyl-1-propanol.

I claim as my invention:

1. A process for the hydroformylation of an olefinic hydrocarbon of at least four carbon atoms which comprises reacting said olefinic hydrocarbon with hydrogen and carbon monoxide at a temperature of from about 75°C to about 300°C and a pressure of from about atmospheric to about 500 atmospheres in the presence of a cobalt catalyst and a zeolite-alumina hydrosol dispersion which has been aged at a temperature of from about 30°C to about 500°C, and recovering the resultant hydroformylated product.

2. The process of claim 1 further characterized in that dispersion is aged at a temperature of from about 45°C to about 500°C and a pressure in the range of from about 1 to about 100 atmospheres for a period of time of from about 1 to about 20 hours.

3. The process of claim 1 further characterized in that the zeolite is mordenite.

4. The process of claim 1 further characterized in that the zeolite is faujasite.

5. The process of claim 1 further characterized in that the alumina hydrosol is an aluminum chloride-aluminum sulfate sol.

6. The process of claim 1 further characterized in that the alumina hydrosol is aluminum chloride hydrosol.

7. The process of claim 1 further characterized in that the olefinic hydrocarbon is decene-5 and the resultant hydroformylated product is 2-pentyl-1-hexanol.

8. The process of claim 1 further characterized in that the olefinic hydrocarbon is butene-2 and the resultant hydroformylated product is 2-ethyl-1propanol.

9. The process of claim 1 further characterized in that the olefinic hydrocarbon is tetradecene-7 and the resultant hydroformylated product is 2-heptyl-1-octanol.

10. The process of claim 1 further characterized in that the olefinic hydrocarbon is a mixture of dodecene-5, tridecene-6 and tetradecene-7 and the resultant hydroformylated product is a mixture of 2-hexyl-1-heptanol, 2-hexyl-1-octanol and 2-heptyl-1-octanol.

11. The process of claim 1 further characterized in that the olefinic hydrocarbon is hexadecene-1 and the resultant hydroformylated product is 1-heptadecanol.

* * * * *